United States Patent [19]

Dekkers

[11] Patent Number: 5,290,881
[45] Date of Patent: Mar. 1, 1994

[54] POLYMER MIXTURE COMPRISING A POLYPHENYLENE ETHER AND A POLYARYLENE SULPHIDE

[75] Inventor: Marinus E. J. Dekkers, Guildersland, N.Y.

[73] Assignee: General Electric Company, Pittsfield, Mass.

[21] Appl. No.: 347,292

[22] Filed: May 3, 1989

[30] Foreign Application Priority Data

May 9, 1988 [NL] Netherlands .......................... 8801199

[51] Int. Cl.$^5$ ...................... C08G 65/48; C08L 67/02
[52] U.S. Cl. .................................. 525/397; 525/537; 524/308; 524/309; 524/310; 524/219
[58] Field of Search ............... 525/390, 391, 392, 392, 525/395, 396, 397, 537; 524/308, 309, 310, 219

[56] References Cited

U.S. PATENT DOCUMENTS

| 3,555,108 | 1/1971 | Bilow et al. ........................ 525/390 |
| 4,021,596 | 5/1977 | Bailey ................................. 525/390 |
| 4,528,346 | 7/1985 | Sugie et al. ........................ 525/396 |
| 4,740,558 | 4/1988 | Mashita et al. .................... 525/397 |
| 4,839,425 | 6/1989 | Mawatari et al. .................. 525/184 |
| 4,873,286 | 10/1989 | Gallucci et al. .................... 525/92 |
| 5,026,764 | 6/1991 | Okabe et al. ...................... 525/537 |
| 5,122,578 | 6/1992 | Han et al. .......................... 525/537 |

FOREIGN PATENT DOCUMENTS

| 0133357 | 2/1985 | European Pat. Off. . |
| 0104543 | 4/1987 | European Pat. Off. . |
| 268765 | 1/1988 | European Pat. Off. . |
| 0262901 | 4/1988 | European Pat. Off. . |
| 129422 | 10/1980 | Japan . |
| 135160 | 10/1980 | Japan . |
| 87591 | 5/1983 | Japan . |
| 63-205358 | 8/1988 | Japan . |
| 5372 | 12/1985 | PCT Int'l Appl. . |
| 6164 | 8/1988 | PCT Int'l Appl. . |

*Primary Examiner*—John C. Bleutge
*Assistant Examiner*—Helen F. Lee

[57] ABSTRACT

The properties of polyphenylene ether-polyarylene sulphide mixtures are improved by the addition of an agent as it is known for the improvement of the properties of polyphenylene ether-polyamide mixtures.

7 Claims, No Drawings

POLYMER MIXTURE COMPRISING A POLYPHENYLENE ETHER AND A POLYARYLENE SULPHIDE

The invention relates to a polymer mixture comprising a polyphenylene ether and a polyarylene sulphide (sulfide). Such polymer mixtures are described in various patent publications: U.S. Pat. No. 4,021,596; JP-A-55/129422 (see WPI Acc. No. 80-83415 C/47); JP-A-62/065351 (see WPI Acc. No. 80-120241/17); JP-A-55/135160 (see WPI Acc. No. 80-87164C/49); JP-A-50/156,561 (see CA, Vol. 84, 1976, page 35, No. 84:106514 v).

Polymer mixtures comprising a polyphenylene ether and a polyarylene sulphide have a combination of properties which each of the individual components does not have, for example, a combination of certain mechanical properties, a good resistance against organic solvents, a better processability and flame-retarding properties. In accordance with the desired combination of properties, the two polymers were used in a variety of mixing natios.

The disadvantage of the known polymer mixtures is that the two polymers do not form a homogeneous mixture. Products manufactured, for example, from these polymer mixtures by injection moulding, show a tendency of delamination. This often leads to a surface having pearl gloss. It also often appears that the addition of further additives, for example, agents to improve the impact strength, to non-homogeneous polymer mixtures, only results in a small improvement of the properties.

The invention provides polymer mixtures which have a better homogeneity.

The invention is based on the discovery that the agents which are used to improve the homogeneity of polymer mixtures which comprise a polyphenylene ether and a polyamide are also suitable to improve the homogeneity of the polymer mixtures according to the invention.

In EP-A-0104543 polymer mixtures are described which comprise a polyphenylene sulphide, an epoxy compound and a thermoplastic resin. The thermoplastic resin used may be a polyphenylene ether resin. A non-cured material is preferably used as a polyphenylene sulphide. The reason for the addition of an epoxy compound is not clear.

The polymer mixture according to the invention is characterised in that it comprises an agent to improve the homogeneity as used for polyphenylene ether-polyamide polymer mixtures, with the exception of epoxy compounds a described in EP-A-0104543.

The agents to improve the homogeneity are also referred to as an agent to improve the compatibility or as an agent to improve the properties.

All the known agents to improve the homogeneity c.q. compatibility of polyphenylene ether-polyamide mixtures have a chemical group which most likely can react with the amine and/or amide group in the polyamide.

Polyarylene sulphides, however, have a quite different structure from polyamides. The applicability of the agents known for polyphenylene ether-polyamide mixtures could not be predicted.

The polymer mixture according to the invention comprises at any rate the following constituents:
A : a polyphenylene ether
B : a polyarylene sulphide
C : an agent to improve the homogeneity.

A. Polyphenylene ether

Polyphenylene ethers are compounds known per se. For this purpose reference may be made to the U.S. Pat. Nos. 3,306,874, 3,306,875; 3,257,357 and 3,257,358. Polyphenylene ethers are usually prepared by an oxidative coupling reaction—in the presence of a copper amine complex—of one or more two-fold or three-fold substituted phenols, homopolymers and copolymers, respectively, being obtained. Copper amine complexes derived from primary, secondary and/or tertiary amines may be used. Examples of suitable polyphenylene ethers are:

poly(2,3-dimethyl-6-ethylphenylene-1,4-ether)
poly(2,3,6-trimethylphenylene-1,4-ether)
poly[2-(4'-methylphenyl)phenylene-1,4-ether]
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example copolymers derived from two or more phenols as used in the preparation of the monopolymers mentioned hereinbefore, are also suitable. Furthermore suitable are graft copolymers and block copolymers of vinylaromatic compounds, for example, polystyrene and of polyphenylene ether as described above.

When an agent is used to improve the homogeneity as indicated hereinafter sub IV, VI, VII or IX, the polyphenylene ether may be replaced entirely or partly by the said agent.

The polymer mixture according to the invention comprises at any rate the following constituents:
A: a polyphenylene ether
B: a polyarylene sulphide
C: an agent to improve the homogeneity.

B. Polyarylene sulphide

Polyarylene sulphides are polymers known per se. Polyarylene sulphides prepared according to one of the known methods of preparing polyarylene sulphides, for example, as described in U.S. Pat. No. 3,354,129 may be used in the polymer mixtures according to the invention. In this method, polyhaloaromatic compounds, alkali metal sulphides and organic amides are contacted with each other under polymerization conditions. A second suitable method is described, for example, in U.S. Pat. No. 3,919,177 in which a p-dihalobenzene, an alkali metal sulphide, an organic amide and an alkali metal carboxylate are contacted with each other in polymerisation conditions.

Polyarylene sulphides which have been subjected to an after-treatment to increase the molecular weight, sometimes termed curing, are preferably used in the polymer mixture according to the invention. This after-treatment is described, for example, in U.S. Pat. Nos. 3,699,087; 3,717,620; 3,725,362 and 3,793,256.

C. Agent to improve the homogeneity

The invention is based on the discovery that all the agents as used for the compatibilisation and/or homogenization of polyphenylene ether-polyamide mixtures are also suitable to improve the homogeneity of polyphenylene ether-polyarylene sulphide. Examples of suitable agents are the following:

I) Compounds having in their molecular structure a two-fold or three-fold carbon-to-carbon bond and a carboxylic acid, acid anhydride, acid amide, imido, carboxylic acid ester, amino, epoxy or hydroxyl group in a quantity from 0.01 to 30 parts by weight per 100 parts by weight of polyarylene sulphide plus polyphenylene ether, II) aliphatic polycarboxyic acids or derivatives thereof of the general formula: $(R_1O)_m R(COOR_2)_n (CONR_3R_4)_s$, wherein R is a saturated hydrocarbon group having 2 to 20 carbon atoms with a linear or branched chain; $R_1$ is a hydrogen atom or an alkyl group, aryl group, acyl group or carbonyldioxy group having 1 to 10 carbon atoms; each $R_2$ independently of each other represents a hydrogen atom or an alkyl group or aryl group having 1 to 20 carbon atoms; each $R_3$ and $R_4$ independently of each other represents a hydrogen atom or an alkyl group or aryl group having 1 to 10 carbon atoms; m is equal to 1 and (n+s) is larger than or equal to 2 and n and s each are larger than or equal to zero; and wherein $(OR_1)$ is in an alpha position or beta position with respect to a carbonyl group and in which at least two carbonyl groups are separated by 2 to 6 carbon atoms, in a quantity of 0.05 to 5 parts by weight per 100 parts by weight of polyarylene sulphide plus polyphenylene ether, III) a silane compound having in its molecular structure both (a) at least a silicon atom which is bonded to a carbon atom via an oxygen bridge and (b) comprises at least an ethenic carbon-to-carbon double bond or a carbon-to-carbon triple bond and/or a functional group selected from an amine group and a mercapto group, in which the functional group is not directly bonded to the silicon atom, in a quantity of 0.05 to 4 parts by weight of polyarylene sulphide plus polyphenylene ether, IV) a functionalised polyphenylene ether consisting of the reaction product of (a) a polyphenylene ether and (b) a compound of the general formula (i)-Z-(ii), wherein (i) is at least a group of formula [X-C(0)] with X=F, Cl, Br, I, OH, —OR, or —O—C(0)—R with R=H, alkyl or aryl, wherein (ii) is at least a carboxylic acid, acid anhydride, acid amide, imido, carboxylic acid ester, amino, epoxy or hydroxyl group, and wherein the groups (i) and (ii) are bonded together covalently via a bridge Z, Z being a bivalent hydrocarbon radical, V) a copolymer with units of a vinylaromatic compound and of an alpha-beta unsaturated dicarboxylic acid or dicarboxylic anhydride or a copolymer with units of a vinylaromatic compound and of an imide compound of an alpha-beta unsaturated dicarboxylic acid, in a quantity of 0.5 to 100 parts by weight per 100 parts by weight of polyarylene sulphide plus polyphenylene ether, VI) the reaction product of a) a 1,2-substituted olefinic compound with carboxyl group or acid anhydride group, b) a polyphenylene ether and c) a radical initiator.

The above-mentioned agents are more explicitly described in EP-A-0236593 and the literature reference mentioned therein.

In addition to the agents mentioned hereinbefore, the following agents are to be considered.

VII) the reaction product of one of the agents mentioned sub I), II) and III) with a polyphenylene ether. This reaction product may be formed in situ in the polymer mixture according to the invention when the various constituents are mixed in the melt, for example, in an extruder. It is also possible to form this reaction product separately and to then add it to the other constituents of the polymer mixture according to the invention.

VIII) styrene copolymers as described, for example, in EP-A-0,237,710; DE-A-3,601,581; EP-A-0,221,341; EP-A-0,222,129 and EP-A-0,184,151. The said copolymers are essentially built up from units derived from styrene monomers and from units with reactive groups. According to the patent publications mentioned hereinbefore, the said copolymers are added to polyphenylene ether-polyamide mixtures to improve the properties thereof. However, this improvement is associated with an improvement of the homogeneity of the polymer mixture, in a quantity of 0.5 to 100 parts by weight per 100 parts by weight of polyarylene sulphide plus polyphenylene ether.

IX) polyphenylene ethers with reactive groups as described in EP-A-0,222,250 and in EP-A-0,226,055. The polyphenylene ethers have reactive carboxyl groups which are introduced in various manners.

The ratio of the various constituents in the polymer mixtures according to the invention may be chosen within wide limits. The polymer mixture according to the invention is preferably composed so that it comprises 1–99 parts by weight, even more preferably 10–90 parts by weight, of polyarylene sulphide per 100 parts by weight of polyphenylene ether plus polyarylene sulphide. The quantities to be chosen depend on the kind of properties to obtain desired to obtain. However, in all the ratios the possibility exists that delamination occurs. The delamination can be suppressed by the addition of the agent referred to previously in the section describing constitutent "C". The minimum quantity of agent C to be used depends on the nature of the agent and on the relative quantity of the constituents A and B. In general, a minimum quantity of 0.1–10 parts by weight of agent C per 100 parts by weight of A plus B will suffice. This quantity can be determined experimentally comparatively easily.

In addition to the constituents mentioned hereinbefore the polymer mixture according to the invention may comprise any conventional constituent, for example: styrene homopolymers and styrene copolymers, high-impact polystyrene, agents to improve the impact strength, reinforcing fibres, for example, glass fibres, mineral fillers, agents to improve the stability, dyes and pigments, flame retardants, plasticizers.

The polymer mixture according to the invention preferably also comprises one or more agents to improve the impact strength. The addition of such agents leads to a considerable improvement of the impact strength in the homogeneous polymer mixtures according to the invention; an improvement which is larger than that which can be obtained in non-homogeneous polymer mixtures. Any agent suitable for polyphenylene ethers and/or polyarylene sulphides to improve the impact strength may be used in the polymer mixtures according to the invention. Particularly suitable are the so-called core-shell copolymers with a rubbery core and one or more shells. Further suitable agents are the vinylaromatic polydiene-di- or triblock copolymers, in which the block copolymer is not hydrogenated or is partially hydrogenated. Partially hydrogenated or non-hydrogenated linear styrene-butadiene-styrene triblock copolymers and partially hydrogenated or non-partially hydrogenated radial styrene-butadiene block copolymers may be mentioned in particular. Some types of polybutadiene, notably those types which are commercially available as a crumbly product, are also suitable.

The polyoctenylene rubbers described in DE-A-3,518,277 and DE-A-3,442,273 are also suitable.

The polymer mixture according to the invention may comprise in addition one or more additives known for polyphenylene ethers and/or for polyarylene sulphides. In particular may be mentioned: reinforcing fibres, for example, glass fibres and fillers.

The polymer mixtures according to the invention are preferably prepared by melt extrusion. In melt extrusion, the individual constituents are provided, for example, in an extruder. The constituents are heated in the extruder, usually to a temperature above the melting temperature of the constituent or one of the constituents having the highest melting-point, for example, the polyarylene sulphide, and are intimately mixed. The so-called extrudate, usually in form of a strand, emanates from the extruder and is then chopped up. The resulting pellets of the polymer mixtures according to the invention can be further processed according to methods known per se for injection moulding of thermoplastic synthetic resins.

It has been found in the preparation of the polymer mixtures according to the invention in an extruder that the sequence in which the various constitents are mixed is of importance. For example, polymer mixtures having better properties are often obtained when the polyphenylene ether or a part of the polyphenylene ether to be used is premixed with the agent C in an extruder in a separate step. The pre-extrudate thus obtained is then mixed with the other constituents in an extruder.

The invention also relates to products obtained from the polymer mixtures according to the invention.

The invention will now be described in greater detail with reference to the ensuing specific examples.

The following constituents are used in the examples:
PPE: Poly(2,6-dimethyl-1,4-phenylene)ether with an intrinsic viscosity of 45 ml/g, measured in chloroform at 25° C.
FPPE-1: Poly(2,6-dimethyl-1,4-phenylene)ether with acid groups, obtained according to the first-mentioned method of example 1 of WO-A-86/02086, with an intrinsic viscosity of 57 ml/g measured in chloroform at 25° C. However, 3.5 parts of trimelitic anhydride acid chloride and 3.5 parts of dimethyl-n-butylamine were used per 100 parts of PPE.
FPPE-2: A pre-extrudate of 100 parts by weight of PPE and 1 part by weight of maleic anhydride prepared in a blade extruder adjusted at 320° C. and 300 rpm.
PPS: A polyarylene sulphide, namely a cured polyphenylene sulphide having a melt viscosity of 200 Pa sec., measured with a Göttfert ® capillary rheometer at 300° C. and a shearing rate of 200 sec$^{-1}$.
SB: (Used in some examples) a partially hydrogenated styrene-ethylene/butylene-styrene triblock copolymer having a molecular weight of approximately 175,000.

EXAMPLE I AND COMPARATIVE EXAMPLE A

The constituents as indicated hereinafter in Table A were compounded in the indicated quantities by weight in a blade extruder adjusted at 300° C. (blade speed 300 rpm). The extrudate was chopped up to pellets. The pellets were pulverised. The resulting powders were extracted with chloroform in a Soxhlet apparatus for 48 hours.

Chloroform is a solvent for polyphenylene ether (with or without acid groups) but not for polyphenylene sulphide. A low content of extractable material indicates that a better interaction has occurred between the polyphenylene sulphide and the polyphenylene ether and a homogeneous mixture with a smaller possibility of delamination has been formed.

In addition, test plates for determining the impact strength, the elongation at fracture and the impact strength were injection moulded from the pellets.

TABLE A

| Example | I | A* |
|---|---|---|
| Composition (parts by weight) | | |
| PPE | 10 | 50 |
| FPPE-1 | 40 | — |
| PPS | 50 | 50 |
| Mechanical properties | | |
| Tensile strength at fracture (MPa) | 46 | 29 |
| Elongation at fracture (%) | 1.5 | 0.9 |
| Impact strength with notch (J/m) | 4 | 5 |
| Impact strength without notch (J/m) | 175 | 165 |
| Other properties | | |
| Content extractable material (wt %) | 25 | 49 |
| Appearance (visually evaluated) | homogeneous | pearl gloss |

*Polymer mixture A has been recorded for comparison

It may be seen from the above results that the polymer mixture according to the invention in some respects has better properties than the polymer mixture according to the comparative example. The content of extractable material is of particular importance: a lower content indicates a better homogeneity. This is expressed in particular in the properties when agents to improve the impact strength are added. This will be further demonstrated with reference to the following specific examples.

EXAMPLES II, III, COMPARATIVE EXAMPLES B, C AND D

The constituents indicated in the Table B were compounded in a blade extruder adjusted at 300° C. (blade speed 300 rpm). The resulting extrudate was chopped up to pellets.

Test pieces to determine the impact strength according to IZOD (ASTM D 256) and to determine the tensile strength (ASTM D 638) were injection moulded from the pellets.

The mechanical properties of the test pieces were determined.

The composition of the various polymer mixture and the resulting properties are recorded in Table B hereinafter.

TABLE B

| Example | B* | C* | D* | II | III |
|---|---|---|---|---|---|
| Composition (parts by weight) | | | | | |

TABLE B-continued

| Example | B* | C* | D* | II | III |
|---|---|---|---|---|---|
| PPE | 32.5 | 32.5 | — | — | — |
| FPPE-1 | — | — | — | 32.5 | — |
| FPPE-2 | — | — | — | 32.5 | 32.5 |
| PPS | 67.5 | 55 | 80 | 55 | 55 |
| SB | — | 12.5 | 20 | 12.5 | 12.5 |
| Mechanical properties | | | | | |
| Impact strength with notch (J/m) | 12.5 | 19 | 14.5 | 37 | 28 |
| Impact strength without notch (J/m) | 165 | 245 | 180 | 460 | 360 |
| Tensile strength at fracture (MPa) | 25 | 45 | 35 | 54 | 49 |
| Elongation at fracture (%) | 0.7 | 2.5 | 1.2 | 3.8 | 2.9 |
| Other properties | | | | | |
| Appearance (visually evaluated) | — | Pearl gloss | — | homogeneous | |

*The polymer mixtures B, C and D have been recorded for comparison.

It may be seen from the results of Table B that it is possible to obtain a polymer mixture having a good impact strength on the basis of the polymer mixtures according to the invention. The impact strength of the known polymer mixtures is improved to a much smaller extent by the addition of an SB block copolymer (compare example C with example II according to the invention).

I claim:

1. A polymer mixture comprising:
   (A) a polyphenylene ether;
   (B) a polyarylene sulphide; and
   (C) polycarboxylic acid compounds or derivative-compounds thereof, as agents to improve the homogeneity of components (A) and (B), said compounds or derivatives having the general formula:

$$(R_1O)_m R(COOR_2)_n (CONR_3R_4)_s$$

wherein R is a saturated hydrocarbon group having 2 to 20 carbon atoms with a linear or branched chain; $R_1$ is a hydrogen atom or an alkyl group, aryl group, acyl group or carbonyldioxy group, each having 1 to 10 carbon atoms; each $R_2$ independently of each other is a hydrogen atom or an alkyl group or aryl group, each having 1 to 20 carbon atoms; each $R_3$ and $R_4$ independently of each other represents a hydrogen atom or an alkyl group or aryl group, each having 1 to 10 carbon atoms; m is equal to 1 and (n+s) is larger than or equal to 2, and n and s each are larger than or equal to zero; and wherein ($OR_1$) is in an alpha position or beta position with respect to a carbonyl group, and in which at least two carbonyl groups are separated by 2 to 6 carbon atoms.

2. The polymer mixture of claim 1, wherein the polyarylene sulphide is cured.

3. A polymer mixture as claimed in claim 1, characterised in that the polymer mixture comprises an agent to improve the impact strength.

4. Articles formed from the polymer mixture of claim 1.

5. The polymer mixture of claim 1, wherein the amount of component (C) present in the composition is in the range of 0.05 to 5 parts by weight per 100 parts by weight of components (A) and (B).

6. The polymer mixture of claim 3, wherein the agent to improve impact strength is selected from the group consisting of of core-shell copolymers with a rubbery core and at least one shell; vinylaromatic polydiene diblock or triblock copolymers, in which the block copolymer is non-hydrogenated or partially hydrogenated; and polyoctenylene rubbers.

7. The polymer mixture of claim 1, further comprising reinforcing fibers.

* * * * *